US009876819B2

(12) United States Patent
Chin et al.

(10) Patent No.: US 9,876,819 B2
(45) Date of Patent: Jan. 23, 2018

(54) METHOD AND SYSTEM FOR RESTORING WEBSITES (71) Applicant: Banff Cyber Technologies Pte Ltd, Singapore (SG)

(72) Inventors: King Wee Matthias Chin, Singapore (SG); Jie Ming Lionel Lim, Singapore (SG); Wee Lye Lay, Singapore (SG)

(73) Assignee: Banff Cyber Technologies Pte Ltd, Singapore (SG)

( * ) Notice: Subject to any disclaimer, the term of this patent is extended or adjusted under 35 U.S.C. 154(b) by 38 days.

(21) Appl. No.: 14/825,580

(22) Filed: Aug. 13, 2015

(65) Prior Publication Data
US 2016/0050230 A1 Feb. 18, 2016

(30) Foreign Application Priority Data

Aug. 14, 2014 (SG) .............................. 10201404914T (51) Int. Cl.
*G06F 21/00* (2013.01)
*H04L 29/06* (2006.01)
*G06F 11/14* (2006.01)
*G06F 21/55* (2013.01)
*G06F 21/57* (2013.01)

(52) U.S. Cl.
CPC ...... *H04L 63/1491* (2013.01); *G06F 11/1451* (2013.01); *G06F 11/1464* (2013.01); *G06F 21/00* (2013.01); *G06F 21/554* (2013.01); *G06F 21/57* (2013.01); *G06F 2201/84* (2013.01)

(58) Field of Classification Search
CPC .................................................... H04L 63/162
See application file for complete search history.

(56) References Cited

U.S. PATENT DOCUMENTS

| 7,254,526 | B2 * | 8/2007 | Aupperle | G06F 17/30864 703/27 |
| 8,566,589 | B1 * | 10/2013 | Satish | H04L 63/1483 713/168 |
| 8,627,288 | B2 * | 1/2014 | Kimball | H04L 41/0853 717/124 |
| 2007/0150743 | A1 * | 6/2007 | Weatherford | G06F 21/31 713/184 |
| 2008/0243634 | A1 * | 10/2008 | Dworkin | G06Q 30/0601 705/26.1 |
| 2010/0088304 | A1 * | 4/2010 | Jackson | G06F 17/30899 707/706 |
| 2010/0138370 | A1 * | 6/2010 | Wu | G06F 17/30702 706/12 |

(Continued)

Primary Examiner — Ali Shayanfar
(74) Attorney, Agent, or Firm — Dilworth IP LLC (57) ABSTRACT A method for restoring a website in the event of a hack or defacement is disclosed. The method comprises the step of copying the at least one webpage of the website with at least one functional element to create a replicated website on a restorer server, the at least one functional element of the replicated website capable of accepting user input to trigger an event. The method further comprises the steps of creating at the restorer server, a secure website replica from the replicated website by deactivating the at least one functional element such that the secure website replica is incapable of accepting user input to trigger the event, and presenting the secure website replica in place of the website once the hack or the defacement of the website has been detected.

27 Claims, 6 Drawing Sheets (56) References Cited

U.S. PATENT DOCUMENTS

| | | | |
|---|---|---|---|
| 2012/0047581 A1* | 2/2012 | Banerjee | G06F 21/554 726/24 |
| 2013/0073400 A1* | 3/2013 | Heath | G06Q 30/02 705/14.73 |
| 2013/0097702 A1* | 4/2013 | Alhamed | G06F 21/64 726/22 |
| 2013/0246523 A1* | 9/2013 | Gokhale | H04L 41/0846 709/204 |
| 2014/0049791 A1* | 2/2014 | Nakamura | G06F 3/1298 358/1.13 |
| 2014/0089661 A1* | 3/2014 | Mahadik | H04L 61/1511 713/162 |
| 2014/0106726 A1* | 4/2014 | Crosbie | H04W 4/046 455/418 |
| 2014/0317754 A1* | 10/2014 | Niemela | H04L 63/1416 726/26 |
| 2014/0337743 A1* | 11/2014 | Branton | H04L 67/02 715/738 |
| 2015/0200962 A1* | 7/2015 | Xu | G06F 21/562 726/23 |
| 2016/0067357 A1* | 3/2016 | Francois | C12Q 1/37 424/9.6 |

* cited by examiner

Figure 6

METHOD AND SYSTEM FOR RESTORING WEBSITES

FIELD OF THE INVENTION

The invention pertains to the field of restoring websites in the event of defacements or hacking.

BACKGROUND

There is an increasing number of websites being defaced and hacked. Once a website has been defaced or hacked, website owners would typically attempt to quell the situation by redirecting users from the defaced or hacked website to a website replica (a backed-up or previous version of the website). This method of "restoring" the website removes the presence of the defaced website and also gives the impression that the problem has been solved while backend engines determine the source and cause of the defacement.

There are anti-defacement solutions available in the market that back-up webpages to create website replicas and restore websites with the website replicas. FortiWeb 5.0.0 is one such solution. FortiWeb 5.0.0 works by backing up the content on the webpage only. FortiWeb does not backup database driven content which does not reside within the page itself but instead resides in a back-end database.

However such solutions suffer from the disadvantage that the website replicas which have "replaced" the original website may still not be secure. This is because whatever vulnerability in the website that resulted in the defacement or hack in the first place, may still very well persist in the website replica. In such a scenario, the replacement of the original website with the website replica actually exacerbates the problem as hackers will still be able to deface the website replica or via the website replica, hack into databases and extract information sensitive data.

An example of this is when the website replica displays text boxes or text fields on a typical "Contact Us" page. The vulnerability in the website replica may be that these text boxes or text fields have not been configured to filter out improper queries or have not been set to properly validate the input being entered into the text boxes or text fields. Hackers can therefore exploit these vulnerabilities by using code injection techniques such as SQL injection or cross-site scripting to extract out database contents and gain elevated access-privileges to sensitive page content. Worse still, the unsecured website replica may give the website owner a false sense of security, all the while being oblivious to the fact that hackers are extracting sensitive information from the unsecured website replica.

Thus, what is required is a novel method and system for creating a website replica that is secure such that when defacement or hacking occurs and web traffic is redirected to the website replica, the website owner can be assured that website replica will not be vulnerable to further attacks from hackers. Furthermore, other desirable features and characteristics will become apparent from the subsequent detailed description and the appended claims, taken in conjunction with the accompanying drawings and this background of the disclosure.

SUMMARY OF INVENTION

According to an aspect of the invention, a method for restoring a website in the event of a hack or a defacement is disclosed, the website comprising at least one webpage having at least one functional element. The method comprises the step of copying the at least one webpage of the website with the at least one functional element to create a replicated website on a restorer server, the at least one functional element of the replicated website capable of accepting user input to trigger an event. The method further comprises the steps of creating at the restorer server, a secure website replica from the replicated website by deactivating the at least one functional element such that the secure website replica is incapable of accepting user input to trigger the event, and presenting the secure website replica in place of the website once the hack or the defacement of the website has been detected.

Preferably, the event is any one of the following: the restorer server accessing an information sensitive database, the restorer server displaying an error message on the replicated website, a client machine downloading files and a redirection to another universal resource locator (URL).

Preferably, the at least one deactivated functional element is any one of the following: a javascript, an input field, a text area, a form, a select tag, a button, an anchor link, an image and a hyperlink.

Preferably, the method further comprises the step of removing at least one embedded element from the secure website replica.

Preferably, the at least one embedded element is any one of the following: an IFrame, an applet tag, an object tag and an XML tag.

Preferably, the method further comprises the step of disabling at least one cascading style sheet on the secure website replica.

Preferably, the step of creating a secure website replica from the replicated website by deactivating the at least one functional element comprises either the step of removing the at least one functional element from the replicated website, or the step of disabling the at least one functional element on the replicated website.

Preferably, the method further comprises the step of preventing a client browser from caching the secure website replica.

Preferably, the hack or the defacement of the website is detected by a defacement detection engine, and the method further comprises the step of redirecting with the defacement detection engine, web traffic from the website to the secure website replica.

Preferably, the step of redirecting with the defacement detection engine, web traffic from the website to the secure website replica comprises the step of updating a record in a domain name server to replace an internet protocol (IP) address of a web server hosting the website, with an IP address of the restorer server.

Preferably, the step of redirecting with the defacement detection engine, web traffic from the website to the secure website replica comprises the step of updating a rule set of a load balancer.

Preferably, the step of redirecting with the defacement detection engine, web traffic from the website to the secure website replica comprises the step of blocking web traffic to a web server hosting the website and allowing web traffic to the restorer server.

Preferably, the method further comprises the step of crawling the website with the restorer server to identify the at least one webpage of the website to be copied.

Preferably, the method further comprises the step of providing a web portal to an organization to allow the organization the ability to customize the deactivation of the at least one functional element, and schedule and initiate the steps of crawling the website, copying the at least one webpage of the website, creating a secure website replica and redirecting web traffic from the website to the secure website replica.

According to another aspect of the invention, a system for restoring a website in the event of a hack or a defacement is disclosed, the website comprising at least one webpage having at least one functional element. The system comprises a restorer server and the restorer server is configured to copy the at least one webpage of the website with the at least one functional element to create a replicated website on the restorer server, the at least one functional element of the replicated website capable of accepting user input to trigger an event. The restorer server is further configured to create a secure website replica from the replicated website by deactivating the at least one functional element such that the secure website replica is incapable of accepting user input to trigger the event, and present the secure website replica in place of the website once the hack or the defacement of the website has been detected.

Preferably, the event is any one of the following: the restorer server accessing an information sensitive database, the restorer server displaying an error message on the replicated website, a client machine downloading files and a redirection to another universal resource locator (URL).

Preferably, the at least one deactivated functional element is any one of the following: a javascript, an input field, a text area, a form, a select tag, a button, an anchor link, an image and a hyperlink.

Preferably, the restorer server is further configured to remove at least one embedded element from the secure website replica.

Preferably, the at least one embedded element is any one of the following: an IFrame, an applet tag, an object tag and an XML tag.

Preferably, the restorer server is further configured to disable at least one cascading style sheet on the secure website replica.

Preferably, the restorer server deactivates the at least one functional element by either removing the at least one functional element from the replicated website, or disabling the at least one functional element on the replicated website.

Preferably, the restorer server is further configured to prevent a client browser from caching the secure website replica.

Preferably, the system further comprises a defacement detection engine for detecting that the website has been hacked or defaced, the defacement detection engine further configured to redirect web traffic from the website to the secure website replica.

Preferably, the defacement detection engine redirects web traffic from the website to the secure website replica by updating a record in a domain name server to replace an Internet protocol (IP) address of a web server hosting the website, with an IP address of the restorer server.

Preferably, the defacement detection engine redirects web traffic from the website to the secure website replica by updating a rule set of a load balancer.

Preferably, the defacement detection engine redirects web traffic from the website to the secure website replica by blocking web traffic to a web server hosting the website and allowing web traffic to the restorer server.

Preferably, the restorer server is further configured to crawl the website to identify the at least one webpage of the website to be copied.

Preferably, the system further comprises a web portal for allowing an organization the ability to customize the deactivation of the at least one functional element, and schedule and initiate the restorer server to crawl the website, copy the at least one webpage of the website and create a secure website replica, and the defacement detection engine to redirect web traffic from the website to the secure website replica.

According to another aspect of the invention, a computer program product for restoring a website in the event of a hack or a defacement is disclosed, the website comprising at least one webpage having at least one functional element. The computer program product has a computer readable storage medium and the computer readable storage medium has computer readable program code configured to copy the at least one webpage of the website with the at least one functional element to create a replicated website, the at least one functional element of the replicated website capable of accepting user input to trigger an event. The computer readable program code is further configured to create a secure website replica from the replicated website by deactivating the at least one functional element such that the secure website replica is incapable of accepting user input to trigger the event, and present the secure website replica in place of the website once the hack or the defacement of the website has been detected.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. Herein, a method and system for restoring a website is disclosed. When defacement or hacking occurs on the website, web traffic is redirected to a secure website replica. This secure website replica is void of any vulnerabilities which hackers can otherwise exploit. Thus the website owner can have peace of mind that no further infractions can be performed on the secure website replica after the initial defacement or hacking. Furthermore, the redirection of web traffic to the secure website replica helps to preserve an organization's reputation by giving the impression that the website had been restored in a quick and efficient manner.

In an embodiment of the invention, the creation of the secure website replica involves copying the webpages to create a replicated website on a restorer, and then deactivating any functional elements on the replicated website that pose a security risk. Functional elements are any elements on the replicated website that is capable of accepting user input (such as text input or mouse input), and upon accepting user input, the functional elements triggers an event. Examples of functional elements are javascripts, input fields, text areas, forms, select tags, buttons, anchor links, images and hyperlinks. The triggered event may be a response from the restorer. A response from the restorer may include the restorer accessing an information sensitive database to update or retrieve sensitive data. Another response from the restorer may include the restorer displaying an error message on the replicated website. The triggered event may be a response from a client browser which has loaded the replicated website. A response from the client browser may be to cause a client machine to download files. Another response from the client browser may be a redirection to another universal resource locator (URL).

Functional elements pose a security risk because hackers can use the functional elements to trigger responses from the restorer or the client browser. Hackers can then "hijack" these responses by the restorer or the client browser to deface or to obtain access to sensitive data. For example, hackers can apply code injection techniques such as SQL, injection into the functional elements such as input fields and text areas to trigger the restorer to retrieve contents from the information sensitive database. Hackers can then hijack the retrieval and extract out important and sensitive data (such as bank account numbers, credit account numbers, identification numbers, phone numbers etc.) from the information sensitive database. In another example, hackers can apply cross-site scripting to the functional elements to trigger the restorer to validate an invalid user input, and display an error message on the replicated website. Hackers can then hijack the error message by displaying defacement images or defacement content in the error message and on the replicated website. In yet another example, hackers can use functional elements such as javascripts to trigger the client browser to cause the client machine to download files containing viruses or to redirect to URLs showing unsavory content.

Therefore, the disclosed invention is advantageous as deactivating the functional elements makes the secure website replica incapable of accepting user input to trigger any event. This prevents hackers from being able to evoke a response from the restorer or the client browser, and then hijacking the response to either gain access to sensitive information or to deface the secure website replica. Deactivating the functional elements essentially severs any link between the secure website replica and information sensitive databases and removes any avenues in which the hacker can exploit for defacement, creating a safe website replica and providing the website owner peace of mind while the hacking or defacement of the original website is being fixed.

In an embodiment of the invention, the functional elements may be deactivated by either removing the functional elements from the replicated website or disabling the functional elements on the replicated website. Removing the functional elements from the replicated website may involve deleting the functional elements from the replicated website altogether. Disabling the functional elements on the replicated website means that the functional elements still appear and are visible, but the functional elements will not respond to any user input. For example, a disabled textbox will not respond to any keyboard input from a user.

In another embodiment of the invention, embedded elements are also removed from the secure website replica. In another embodiment of the invention, cascading style sheets on the secure website replica are also disabled. While exemplary embodiments have been presented in the foregoing detailed description of the invention, it should be appreciated that a vast number of variations exist.

Figure 1:
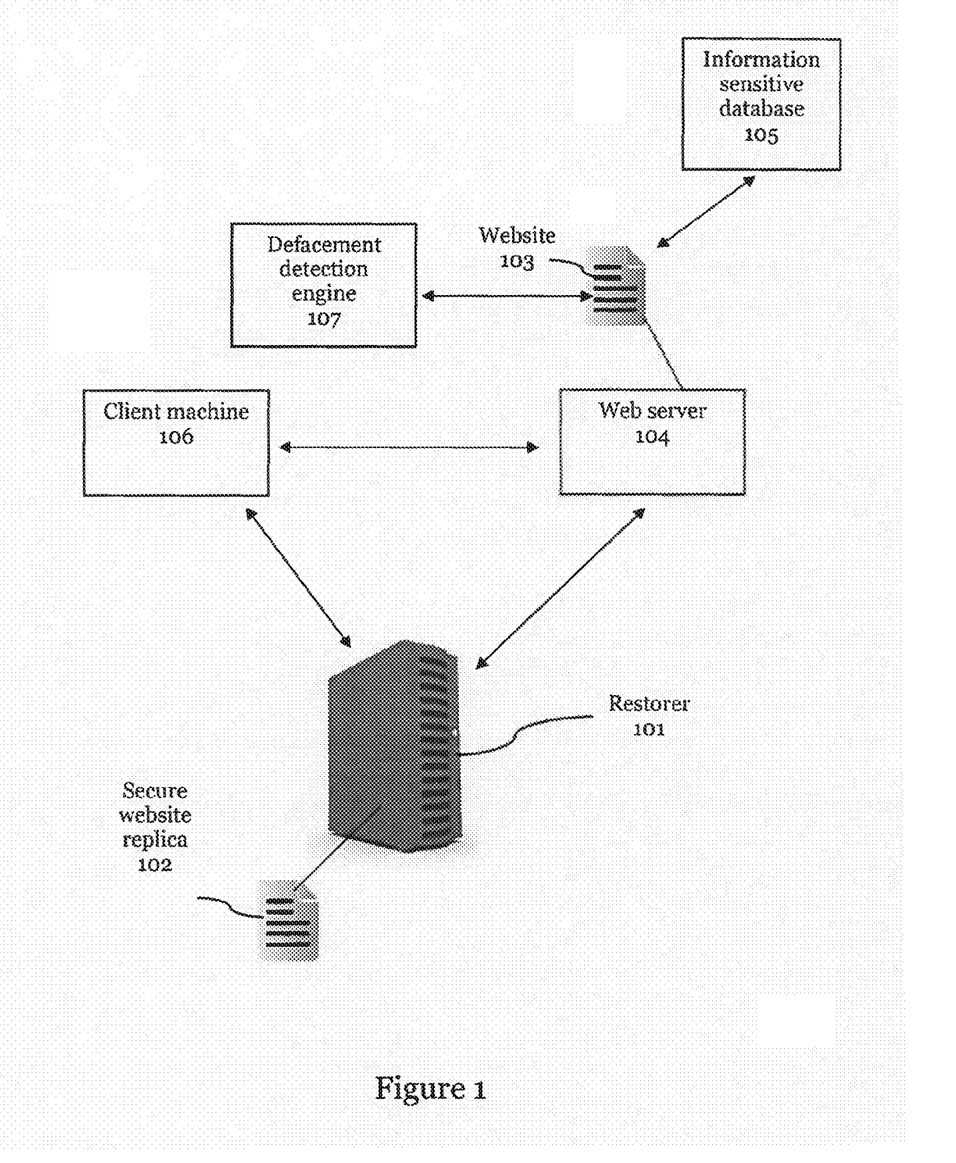
FIG. 1 shows a system for restoring a website in accordance with an embodiment of the present invention.

FIG. 1 shows a system for restoring websites in accordance with an embodiment of the present invention. The system comprises restorer 101. Restorer 101 can be any server, computer, or a group of servers or a group of computers or the like. Restorer 101 stores secure website replica 102. Secure website replica 102 functions as a backup for website 103 hosted on web server 104 in the event of website 103 being hacked or defaced. Web server 104 can be any server, computer or the like. Each webpage on website 103 can have functional elements (not shown). Website 103 can have a link to information sensitive database 105.

Preferably, restorer 101 stores a plurality of secure website replicas 102. Each secure website replica 102 can represent versions of website 103 at different points in time. A user accesses website 103 via a client browser on client machine 106. Client machine 106 can be any smart phone, tablet, computer gadget or the like. The system also comprises defacement detection engine 107. Defacement detection engine 107 monitors website 103 for defacement. When defacement detection engine 107 detects that website 103 has been defaced, defacement detection engine 107 will redirect web traffic from website 103 onto secure website replica 102. Defacement detection engine 107 can be any server, computer, or a group of servers or a group of computers or the like.

Figure 2:
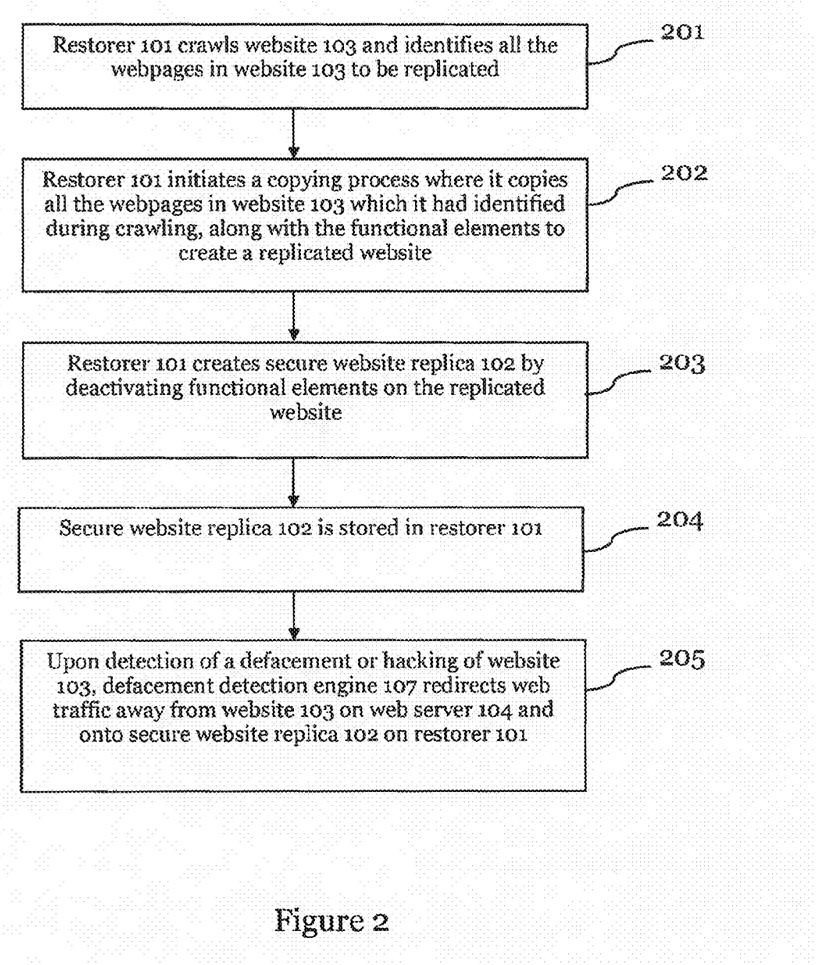
FIG. 2 shows a method for restoring a website in accordance with an embodiment of the present invention.

FIG. 2 shows a method for restoring a website in accordance with an embodiment of the present invention. In step 201, restorer 101 crawls website 103 and identifies all the webpages in website 103 to be replicated. By crawling, restorer 101 also determines the structure of website 103 and how its webpages link to one another.

In step 202, restorer 101 initiates a copying process where it copies all the webpages in website 103 which it had identified during crawling, along with the functional elements to create a replicated website. As a result of the copying process, the replicated website would also have the same links to information sensitive database 105 as website 103. The functional elements of replicated website are any elements on the replicated website that is capable of accepting user input (such as text input or mouse input), and upon accepting user input, the functional elements triggers an event. Examples of functional elements are javascripts, input fields, text areas, forms, select tags, buttons, anchor links, images and hyperlinks. The triggered event may be a response from restorer 101. A response from restorer 101 may include restorer 101 accessing information sensitive database 105 to update or retrieve sensitive data. Another response from restorer 101 may include restorer 101 displaying an error message on the replicated website. The triggered event may be a response from the client browser on client machine 106 which has loaded the replicated website. A response from the client browser may cause client machine 106 to download files. Another response from the client browser may be a redirection to another universal resource locator (URL).

In step 203, restorer 101 creates secure website replica 102 by deactivating functional elements on the replicated website. Preferably, functional elements that can accept user input in the form of text are deactivated. Preferably, the functional elements that are deactivated are javascripts, input fields, text areas and forms. Preferably, functional elements that can accept user input in the form of mouse clicks are deactivated. Preferably, the functional elements that are deactivated are select tags, buttons, anchor links images and hyperlinks.

Preferably, the functional elements are deactivated by removing the functional elements from the replicated website. Preferably, removing the functional elements from the replicated website involves deleting the functional elements from the replicated website altogether. Preferably, the functional elements are deactivated by disabling the functional elements on the replicated website. Preferably, disabling the functional elements on the replicated website means that the functional elements still appear and are visible, but the functional elements will be unresponsive to any user input. For example, a disabled textbox will be unresponsive to any keyboard or mouse input from client machine 106.

Therefore, the disclosed invention is advantageous as deactivating the functional elements makes secure website replica 102 incapable of accepting user input to trigger any event. This prevents hackers from being able to evoke a response from restorer 101 or the client browser, and then hijacking the response to either gain access to sensitive information or to deface the secure website replica. Furthermore, as functional elements essentially act as a link or conduit to the information sensitive database 105 or a "window" to information sensitive data, by deactivating the functional elements, the disclosed method is advantageous as it essentially severs the link to information sensitive database 105, and hackers would have no access or no "window" via secure website replica 102 to the information sensitive data. Hackers would therefore be unable to apply code injection techniques such as SQL injection or cross-site scripting to functional elements because the functional elements would simply no longer be present or visible on secure website replica 102. Or if still present on secure website replica 102, the functional elements (such as a textbox) would no longer work i.e. the textbox would be unresponsive to keyboard or mouse input from client machine 106.

In step 204, secure website replica 102 is stored in restorer 101. Alternatively, secure website replica 102 can be stored in a memory location restorer 101 can access.

In step 205, upon detection of a defacement or hacking of website 103 by defacement detection engine 107, defacement detection engine 107 redirects web traffic away from website 103 on web server 104 and onto secure website replica 102 on restorer 101. As secure website replica 102 is void of any functional elements whose vulnerabilities hackers can otherwise exploit, therefore the organization who owns website 103 can have peace of mind that no further infractions can be performed on secure website replica 102, or on information sensitive database 105 via secure website replica 102. Furthermore, the redirection of web traffic to secure website replica 102 helps to preserve the organization's reputation by giving the impression that website 103 had been restored in a quick and efficient manner.

Upon successful removal of the defacement, or resolution of the hacking of website 103, defacement detection engine 107 redirects web traffic away from secure website replica 102 on restorer 101 and back to website 103 on web server 104. Restorer 101 can then be polled to crawl website 103 again and the process is repeated.

In an embodiment, to further enhance the security of secure website replica 102, restorer 101 removes any embedded elements from secure website replica 102. Embedded elements are typically elements that insert content from another source into the webpages on website 103. Examples of embedded elements include IFrames, applet tags, object tags and XML tags.

In an embodiment, to further enhance the security of secure website replica 102, restorer 101 disables any cascading style sheets on secure website replica 102.

In an embodiment, to further enhance the security of secure website replica 102, restorer 101 can update a header such that the client browser on the client machine 106 is prevented from caching secure website replica 102.

Figure 3:
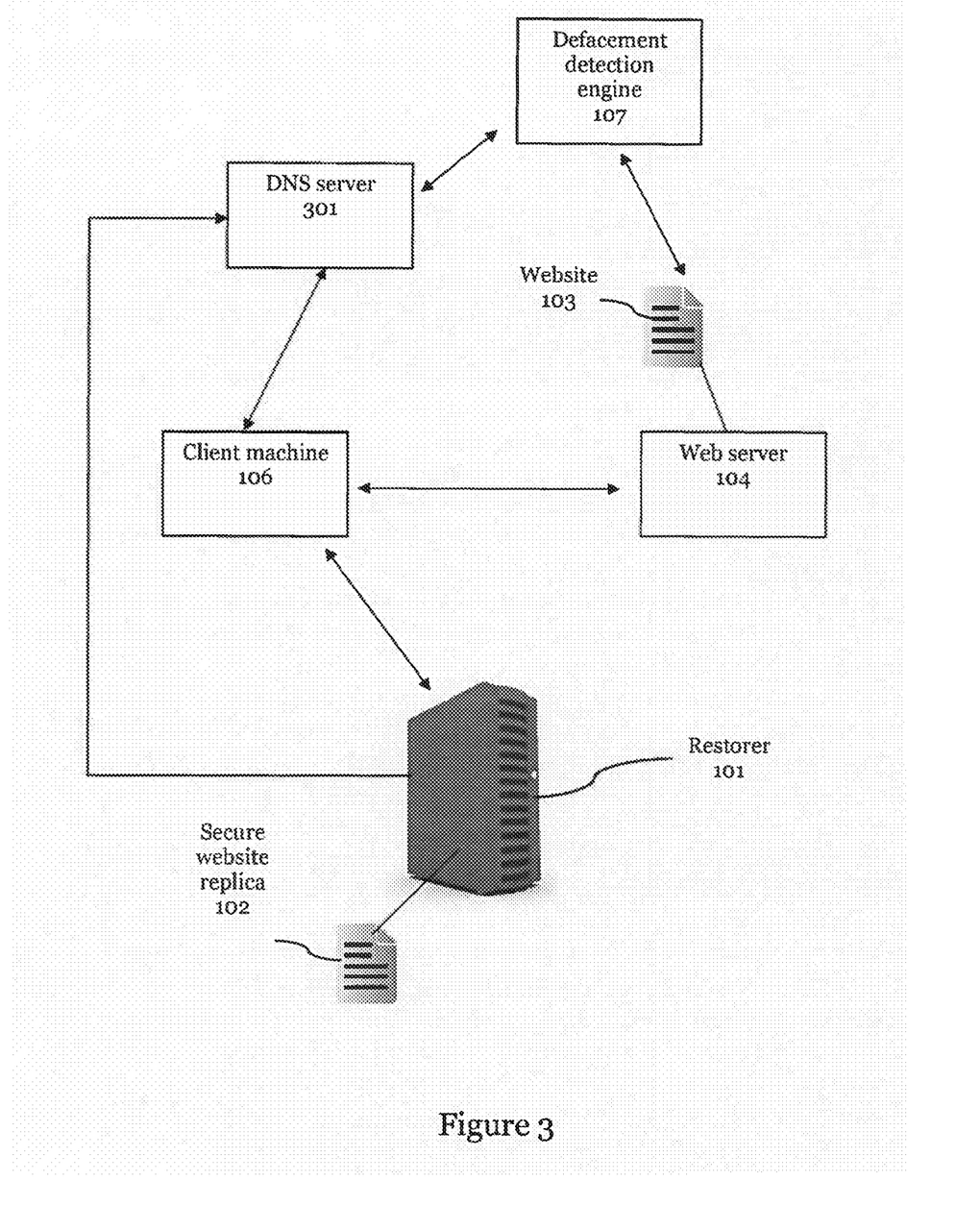
FIG. 3 illustrates an embodiment in which web traffic can be redirected away from website and onto secure website replica.

There are a number of ways in which defacement detection engine 107 can redirect web traffic away from website 103 on web server 104 and onto secure website replica 102 on restorer 101. FIG. 3 illustrates an embodiment of the invention having domain name system (DNS) server 301. To access website 103, client machine 106 can query DNS server 301. DNS server 301 will retrieve the Internet protocol (IP) address of web server 104 (for example 1.1.1.1) from its records. DNS sever 301 can then provide client machine 106 with the IP address 1.1.1.1 and client machine 106 can then access website 103. When website 103 has been defaced or hacked, defacement detection engine 107 can perform a failover by updating the records in DNS server 301 to replace the IP address of web server 104 with the IP address of restorer 101 (for example 2.2.2.2). Therefore subsequently when client machine 106 queries DNS server 301, DNS server 301 will provide client machine 106 with the IP address of restorer 101 (2.2.2.2) and client machine 106 will be directed to restorer 101. Client machine 106 will then view secure website replica 102 instead of website 103. Upon successful removal of the defacement, or resolution of the hacking of website 103, web traffic is redirected away from secure website replica 102 on restorer 101 and back to website 103 on web server 104 by defacement detection engine 107 updating the records in DNS server 301 to replace the IP address of restorer 101 with the IP address of web server 104.

Figure 4:
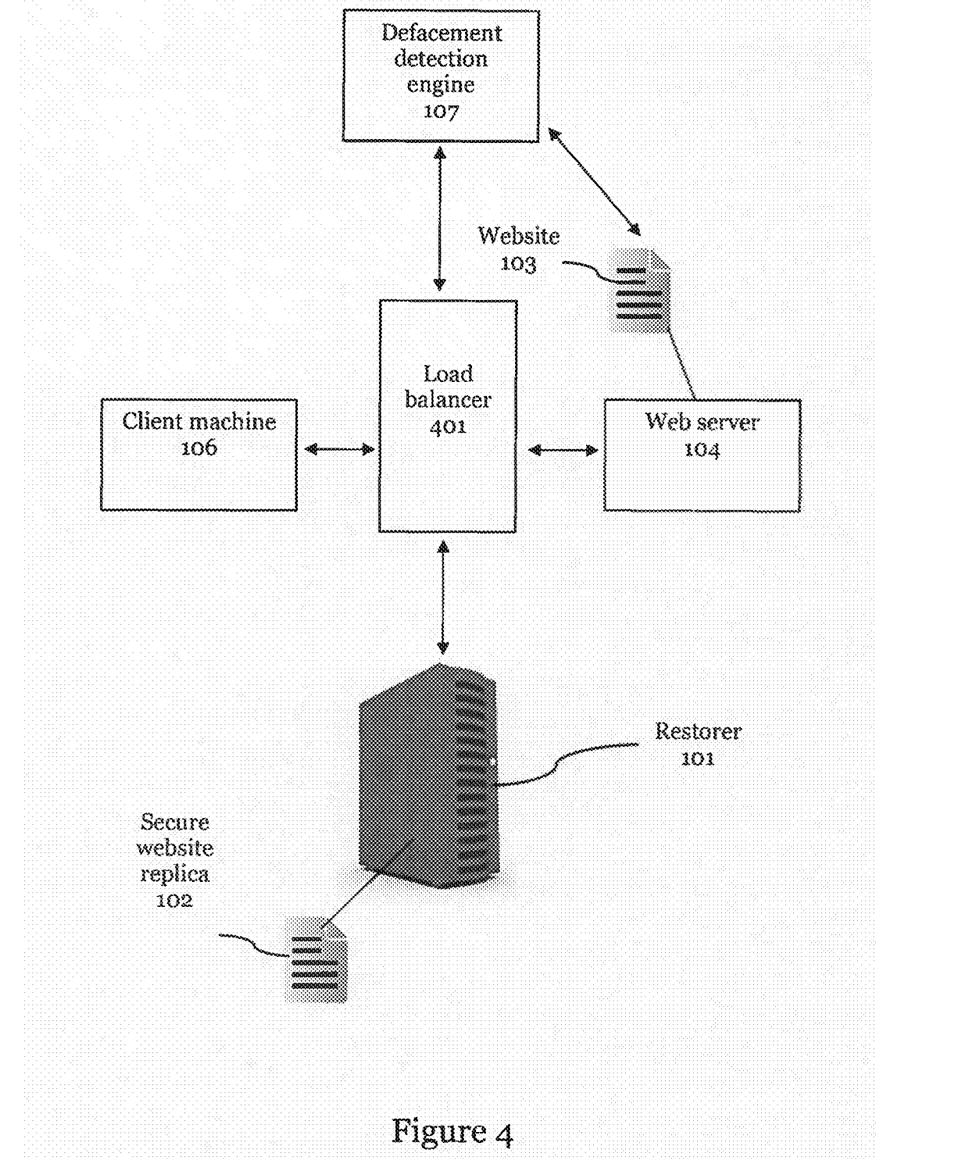
FIG. 4 illustrates an embodiment in which web traffic can be redirected away from website and onto secure website replica.

FIG. 4 illustrates another embodiment in which defacement detection engine 107 can redirect web traffic away from website 103 on web server 104 and onto secure website replica 102 on restorer 101. FIG. 4 shows load balancer 401 which controls web traffic. If client machine 106 wants to access website 103 on web server 104, it has to go through load balancer 401. When website 103 has been defaced or hacked, defacement detection engine 107 can perform a failover by updating the rule set of load balancer 401 to redirect web traffic from web server 104 to restorer 101. Client machine 106 will then view secure website replica 102 instead of website 103. Upon successful removal of the defacement, or resolution of the hacking of website 103, web traffic is redirected away from secure website replica 102 on restorer 101 and back to website 103 on web server 104 by defacement detection engine 107 once again updating the rule set of load balancer 401.

Figure 5:
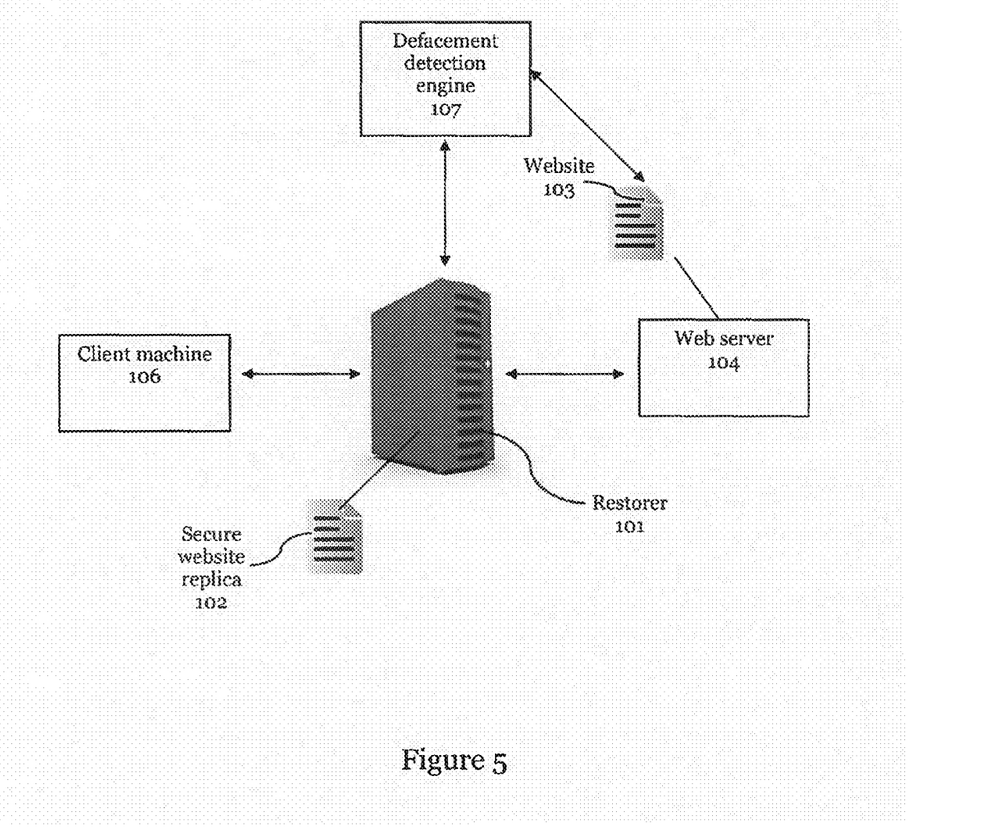
FIG. 5 illustrates an embodiment in which web traffic can be redirected away from website and onto secure website replica.

FIG. 5 illustrates another embodiment in which web traffic can be redirected away from website 103 on web server 104 and onto secure website replica 102 on restorer 101. In FIG. 5, restorer 101 is deployed as a bridge between web server 104 and client machine 106. If client machine 106 wants to access website 103 on web server 104, it has to go through restorer 101. When website 103 has been defaced or hacked, defacement detection engine 107 instructs restorer 101 to block web traffic to web server 104 and provides secure website replica 102 to client machine 106. Client machine 106 will then view secure website replica 102 instead of website 103. Upon successful removal of the defacement, or resolution of the hacking of website 103, defacement detection engine 107 instructs restorer 101 to allow web traffic back to web server 104 such that website 103 can be accessed.

Though the embodiments above describe that the detection of defacement and the redirection of web traffic is done by defacement detection engine 107, one skilled in the art can appreciate that restorer 101 can be modified to also perform the functionalities of defacement detection engine 107.

In an embodiment of the invention, restorer 101 can provide a web portal for organizations to customize the manner in which restorer 101 creates secure website replicas 102 of their websites 103. For example, via the web portal, an organization can optionally select which functional elements to deactivate. If certain functional elements such as text boxes or text fields have already been configured to filter out improper queries, the organization may choose to not deactivate these functional elements, but choose to deactivate only other functional elements such as javascripts instead. An organization can also use the web portal to optionally remove embedded elements from the secure website replica 102. An organization can also use the web portal to optionally disable cascading style sheets on the secure website replica 102. Via the web portal, the organization can also specify scheduled timings for restorer 101 to crawl website 103, copy website 103 and then create secure website replicas 102. This is advantageous as organizations update website 103 regularly and organizations usually know the schedule of these updates. Therefore, synchronizing the crawling and copying of website 103 with the scheduled updates allow the creation of secure website replica 102 based on the "latest updated" version of website 103. Alternatively, organizations can use the web portal to create secure website replica 102 on an ad-hoc basis. The web portal also allows the organization to manage their plurality of secure website replicas 102. The organization can use the web portal to preview their secure website replicas 102, and choose which one of these to be the "active" secure website replica 102 (i.e. the secure website replica 102 that will be used to temporarily replace website 103). Through the web portal, the organization can also cause defacement detection engine 107 to initiate the redirection of web traffic from website 103 to secure website replica 102.

Figure 6:
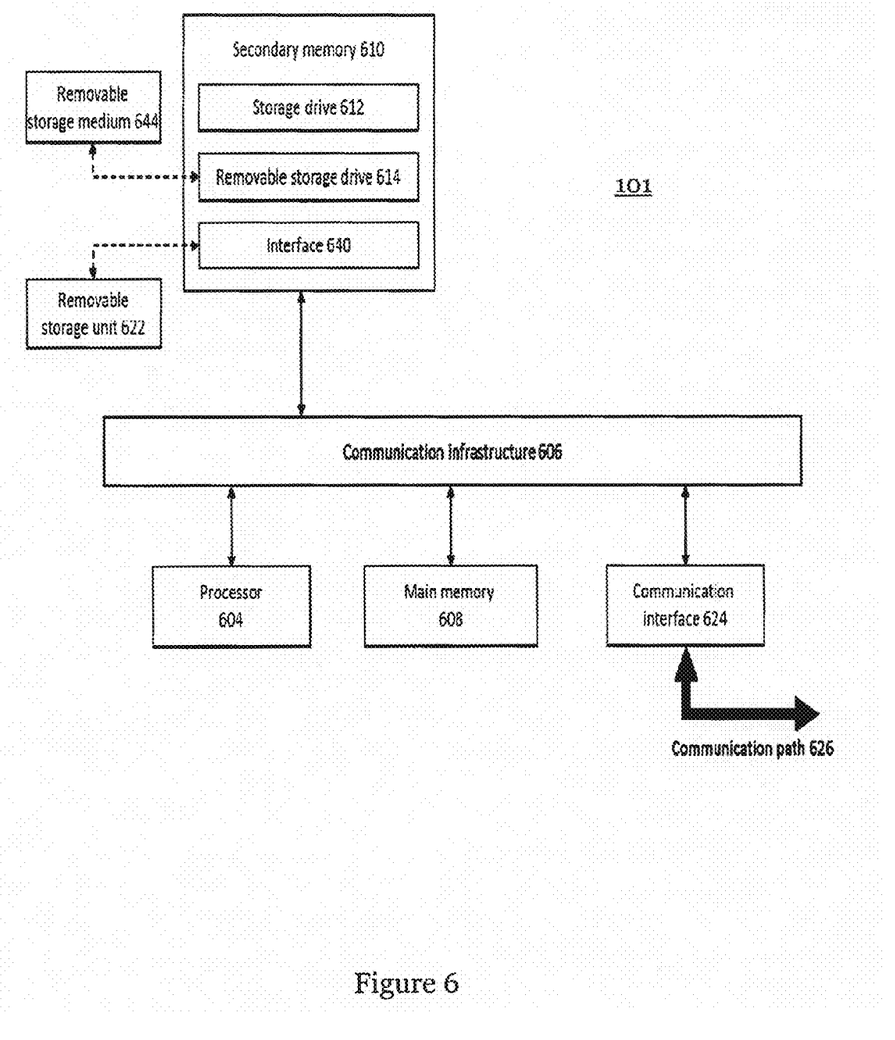
FIG. 6 shows an exemplary restorer in accordance with an embodiment of the invention.

The following description of restorer 101 is provided by way of example only and is not intended to be limiting. Restorer 101 may comprise of a server or a plurality of servers. As shown in FIG. 6, the exemplary restorer 101 includes a process& 604 for executing software routines. Although a single processor is shown for the sake of clarity, restorer 101 may also include a multi-processor system. The processor 604 is connected to a communication infrastructure 606 for communication with other components of restorer 101. The communication infrastructure 606 may include, for example, a communications bus, cross-bar, or network. Restorer 101 further includes a main memory 608, such as a random access memory (RAM), and a secondary memory 610.

The secondary memory 610 may include, for example, a storage drive 612, which may be a hard disk drive, a solid state drive or a hybrid drive and/or a removable storage drive 614, which may include a magnetic tape drive, an optical disk drive, a solid state storage drive (such as a USB flash drive, a flash memory device, a solid state drive or a memory card), or the like. The removable storage drive 614 reads from and/or writes to a removable storage medium 644 in a well-known manner. The removable storage medium 644 may include magnetic tape, optical disk, non-volatile memory storage Medium, or the like, which is read by and written to by removable storage drive 614. As will be appreciated by persons skilled in the relevant art(s), the removable storage medium 644 includes a computer readable storage medium having stored therein computer executable program code instructions and/or data. In an alternative implementation, the secondary memory 610 may additionally or alternatively include other similar means for allowing computer programs or other instructions to be loaded into restorer 101. Such means can include, for example, a removable storage unit 622. Examples of a removable storage unit 622 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 622 which allow software and data to be transferred from the removable storage unit 622 to restorer 101.

Restorer 101 also includes at least one communication interface 624. The communication interface 624 allows software and data to be transferred between restorer 101 and external devices via a communication path 626. In various embodiments of the inventions, the communication interface 624 permits data to be transferred between restorer 101 and a data communication network, such as a public data or private data communication network. Examples of a communication interface 624 can include a modem, a network interface (such as an Ethernet card), a communication port (such as a serial, parallel, printer, GPIB, IEEE 1393, RJ35, USB), an antenna with associated circuitry and the like. The communication interface 624 may be wired or may be wireless. Software and data transferred via the communication interface 624 are in the form of signals which can be electronic, electromagnetic, optical or other signals capable of being received by communication interface 624. These signals are provided to the communication interface via the communication path 626.

Software may be stored in a computer program product and loaded into restorer 101 using the removable storage drive 614, the storage drive 612, or the interface 640. Alternatively, the computer program product may be downloaded to restorer 101 over the communications path 626. The software, when executed by the processor 604, causes restorer 101 to perform functions of embodiments described herein. It is to be understood that the embodiment of FIG. 6 is presented merely by way of example. Therefore, in some embodiments one or more features of restorer 101 may be omitted. Also, in some embodiments, one or more features of restorer 101 may be combined together. Additionally, in some embodiments, one or more features of restorer 101 may be split into one or more component parts.

As used herein, the term "computer program product" may refer, in part, to removable storage medium 644, removable storage unit 622, a hard disk installed in storage drive 612, or a carrier wave carrying software over communication path 626 (wireless link or cable) to communication interface 624. Computer readable storage media refers to any non-transitory, non-volatile tangible storage medium that provides recorded instructions and/or data to restorer 101 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of restorer 101. Examples of transitory or non-tangible computer readable transmission media that may also participate in the provision of software, application programs, instructions and/or data to restorer 101 include radio or infra-red transmission channels as well as a network connection to another computer or networked device, and the Internet or Intranets including e-mail transmissions and information recorded on websites and the like.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the preferred method.

In the application, unless specified otherwise, the terms "comprising", "comprise", and grammatical variants thereof, intended to represent "open" or "inclusive" language such that they include recited elements but also permit inclusion of additional, non-explicitly recited elements.

It will be apparent that various other modifications and adaptations of the application will be apparent to the person skilled in the art after reading the foregoing disclosure without departing from the spirit and scope of the application and it is intended that all such modifications and adaptations come within the scope of the appended claims.

The invention claimed is:

1. A method for restoring a web site in the event of a hack or a defacement, the website comprising at least one webpage having at least one functional element, the method comprising the steps of:

copying the at least one webpage of the website with the at least one functional element to create a replicated web site on a restorer server, the at least one functional element of the replicated website capable of accepting user input to trigger an event;

creating at the restorer server, a secure website replica from the replicated website by deactivating the at least one functional element rendering the secure website replica incapable of accepting user input to trigger the event by at least one of removing or disabling the at least one functional element of the replicated website;

presenting the secure website replica in place of the website once the hack or the defacement of the website has been detected; and redirecting web traffic from the website to the secure website replica.

2. The method of claim 1 wherein the event is any one of the following: the restorer server accessing an information sensitive database, the restorer server displaying an error message on the replicated website, a client machine downloading files and a redirection to another universal resource locator (URL).

3. The method of claim 1 wherein the at least one deactivated functional element is any one of the following: a javascript, an input field, a text area, a form, a select tag, a button, an anchor link, an image and a hyperlink.

4. The method of claim 1 further comprising the step of removing at least one embedded element from the secure website replica.

5. The method of claim 4 wherein the at least one embedded element is any one of the following: an IFrame, an applet tag, an object tag and an XML tag.

6. The method of claim 1 further comprising the step of disabling at least one cascading style sheet on the secure website replica.

7. The method of claim 1 further comprising the step of preventing a client browser from caching the secure website replica.

8. The method of claim 1 wherein the hack or the defacement of the website is detected by a defacement detection engine.

9. The method of claim 8 wherein the step of redirecting with the defacement detection engine, web traffic from the website to the secure website replica comprises the step of updating a record in a domain name server to replace an internet protocol (IP) address of a web server hosting the website, with an IP address of the restorer server.

10. The method of claim 8 wherein the step of redirecting with the defacement detection engine, web traffic from the website to the secure website replica comprises the step of updating a rule set of a load balancer.

11. The method of claim 8 wherein the step of redirecting with the defacement detection engine, web traffic from the website to the secure website replica comprises the step of blocking web traffic to a web server hosting the website and allowing web traffic to the restorer server.

12. The method of claim 1 further comprising the step of crawling the website with the restorer server to identify the at least one webpage of the website to be copied.

13. The method of claim 12 further comprising the step of providing a web portal to an organization to allow the organization the ability to customize the deactivation of the at least one functional element, and schedule and initiate the steps of crawling the website, copying the at least one webpage of the website, creating a secure website replica and redirecting web traffic from the website to the secure website replica.

14. A system for restoring a website in the event of a hack or a defacement, the website comprising at least one webpage having at least one functional element, the system comprising a restorer server having a processor and a memory, the restorer server configured to:
- copy the at least one webpage of the website with the at least one functional element to create a replicated website on a restorer server, the at least one functional element of the replicated website capable of accepting user input to trigger an event;
- create a secure website replica from the replicated website by deactivating the at least one functional element rendering the secure website replica incapable of accepting user input to trigger the event by at least one of removing or disabling the at least one functional element of the replicated web site;
- present the secure website replica in place of the website once the hack or the defacement of the website has been detected; and
- redirect web traffic from the website to the secure website replica.

15. The system of claim 14 wherein the event is any one of the following: the restorer server accessing an information sensitive database, the restorer server displaying an error message on the replicated website, a client machine downloading files and a redirection to another universal resource locator (URL).

16. The system of claim 14 wherein the at least one deactivated functional element is any one of the following: a javascript, an input field, a text area, a form, a select tag, a button, an anchor link, an image and a hyperlink.

17. The system of claim 14 wherein the restorer server is further configured to remove at least one embedded element from the secure website replica.

18. The system of claim 17 wherein the at least one embedded element is any one of the following: an IFrame, an applet tag, an object tag and an XML tag.

19. The system of claim 14 wherein the restorer server is further configured to disable at least one cascading style sheet on the secure website replica.

20. The system of claim 14 wherein the restorer server is further configured to prevent a client browser from caching the secure website replica.

21. The system of claim 14 further comprising a defacement detection engine for detecting that the website has been hacked or defaced.

22. The system of claim 21 wherein the defacement detection engine redirects web traffic from the website to the secure website replica by updating a record in a domain name server to replace an internet protocol (IP) address of a web server hosting the website, with an IP address of the restorer server.

23. The system of claim 21 wherein the defacement detection engine redirects web traffic from the website to the secure website replica by updating a rule set of a load balancer.

24. The system of claim 21 wherein the defacement detection engine redirects web traffic from the website to the secure website replica by blocking web traffic to a web server hosting the website and allowing web traffic to the restorer server.

25. The system of claim 14 wherein the restorer server is further configured to crawl the website to identify the at least one webpage of the website to be copied.

26. The system of claim 25 further comprising a web portal for allowing an organization the ability to customize the deactivation of the at least one functional element, and schedule and initiate the restorer server to crawl the website, copy the at least one webpage of the website and create a secure website replica, and the defacement detection engine to redirect web traffic from the website to the secure website replica.

27. A computer program product for restoring a website in the event of a hack or a defacement, the website comprising at least one webpage having at least one functional element, the computer program product having a non-transitory computer readable storage medium having computer readable program code operable on a restorer server having a processor and a memory, the computer readable program code configured to:
- copy the at least one webpage of the website with the at least one functional element to create a replicated website on a restorer server, the at least one functional element of the replicated website capable of accepting user input to trigger an event;
- create a secure website replica from the replicated website by deactivating the at least one functional element rendering the secure website replica incapable of accepting user input to trigger the event by at least one of removing or disabling the at least one functional element of the replicated web site;
- present the secure website replica in place of the website once the hack or the defacement of the website has been detected; and
- redirect web traffic from the website to the secure website replica.

* * * * *